United States Patent [19]

Takamiya et al.

[11] Patent Number: 4,732,054
[45] Date of Patent: Mar. 22, 1988

[54] STEPLESS SPEED CHANGE DEVICE

[75] Inventors: Kikuzo Takamiya, Kitamoto; Masakazu Inaba, Kumagaya; Kunitoshi Kozakae, Ageo; Mitsuo Tanaka, Kuki, all of Japan

[73] Assignee: Bridgestone Cycle Co., Ltd., Tokyo, Japan

[21] Appl. No.: 876,216

[22] Filed: Jun. 19, 1986

[30] Foreign Application Priority Data

| Jun. 27, 1985 | [JP] | Japan | 60-138886 |
| Oct. 3, 1985 | [JP] | Japan | 60-219196 |
| Oct. 3, 1985 | [JP] | Japan | 60-219197 |
| Oct. 3, 1985 | [JP] | Japan | 60-219198 |

[51] Int. Cl.$^4$ .............................................. F16H 3/44
[52] U.S. Cl. ...................................... 74/750 B; 74/804
[58] Field of Search .................. 74/804, 750 B, 750 R, 74/781 B, 368; 192/64, 43.1

[56] References Cited

U.S. PATENT DOCUMENTS

| 2,799,183 | 7/1957 | Rhein et al. | 74/750 B |
| 2,988,186 | 6/1961 | Dotter | 192/64 |
| 3,021,728 | 2/1962 | Shimano | 74/750 B |
| 3,270,589 | 9/1966 | Schwerdhofer | 74/750 B |
| 3,299,745 | 1/1967 | Toplis | 74/750 B |
| 3,438,283 | 4/1969 | Schwerdhofer | 74/750 B |
| 3,608,398 | 9/1971 | Segawa et al. | 74/750 B X |
| 3,803,947 | 4/1974 | Hillyer | 74/750 B |
| 4,363,390 | 12/1982 | Eisend et al. | 192/64 X |

FOREIGN PATENT DOCUMENTS

| 609114 | 8/1926 | France | 192/64 |
| 34-1722 | 3/1959 | Japan | |

Primary Examiner—Lawrence Staab
Assistant Examiner—David Novais
Attorney, Agent, or Firm—Parkhurst & Oliff

[57] ABSTRACT

A stepless speed change device comprises internally toothed ratchet rings arranged in plural rows side by side in an axial direction on an inner circumference of a driving rotary member on an input side through one-way clutches interposed therebetween, a stationary ring fixed to a frame of a bicycle and encircling the driving rotary member, a plurality of planet rollers rotatably fitted in the driving rotary member at plural locations, pawls in plural rows to engage ratchets of the internally toothed ratchet rings and having bottoms pivotally connected to an eccentric cam whose eccentricity relative to a center shaft is adjustable, and a resilient member provided in contact with the planet rollers to produce the frictional transmission between the stationary ring and the internally toothed ratchet rings respectively and the planet rollers. When the driving rotary member is being rotated the planet rollers are revolved together with the driving rotary member and at the same time are rotated about their axes with the aid of the frictional transmission and the internally toothed ratchet rings are rotated by the planet rollers with the aid of the frictional transmission.

16 Claims, 23 Drawing Figures

FIG_1

FIG_2

FIG_4
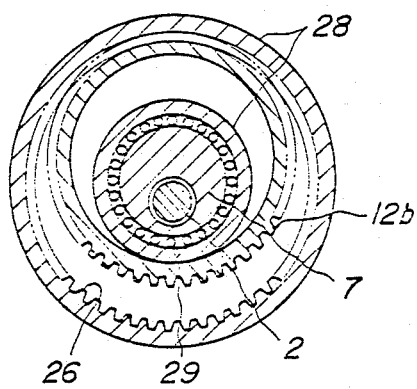
FIG_5
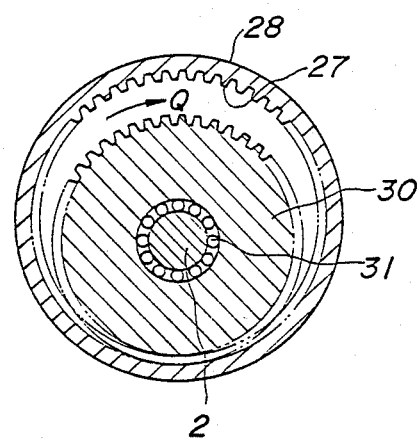

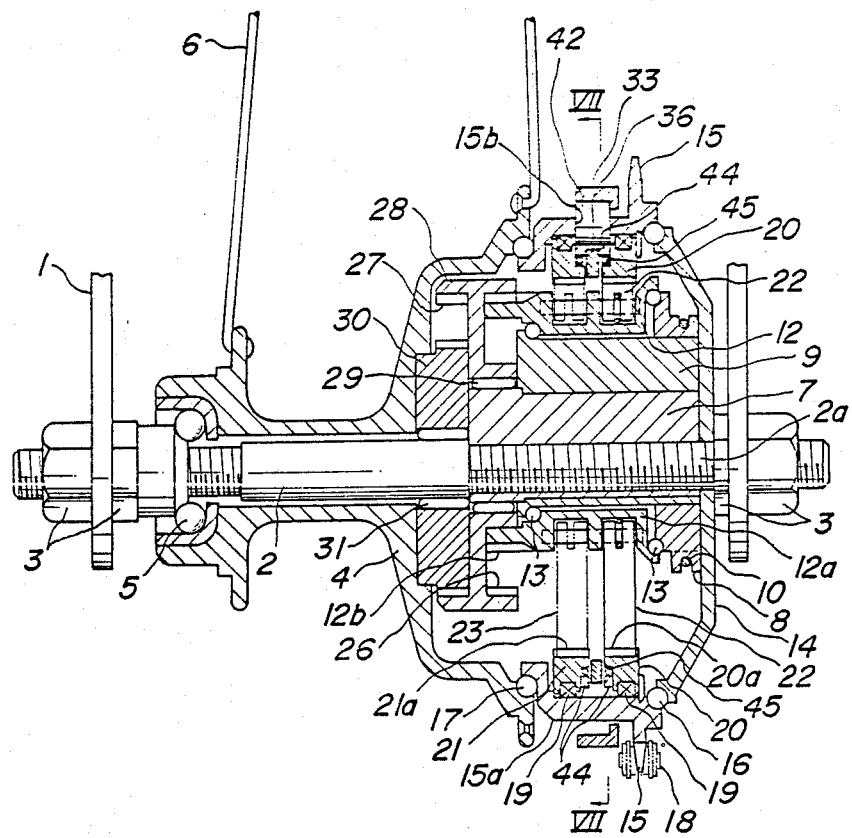
FIG_6

FIG_7
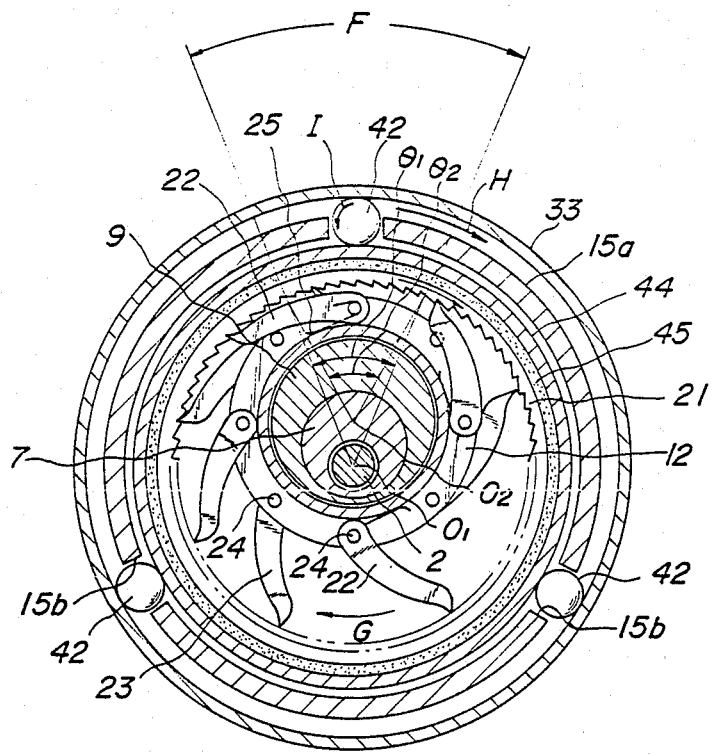

FIG_8
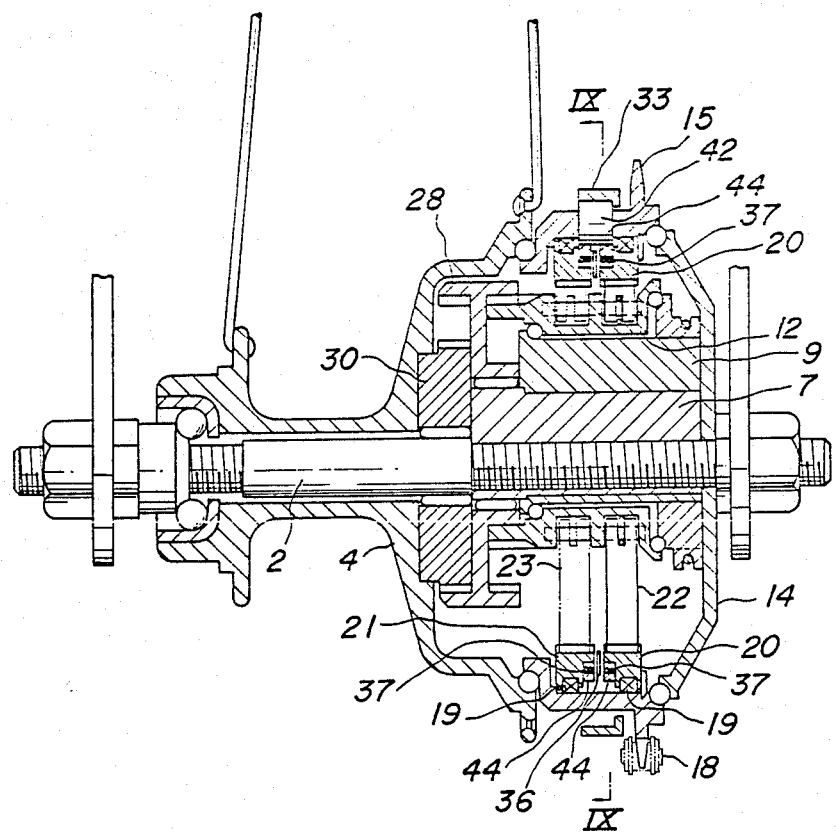

FIG_10

FIG_11

FIG_13

FIG_14

FIG_15

FIG_16

FIG_18a
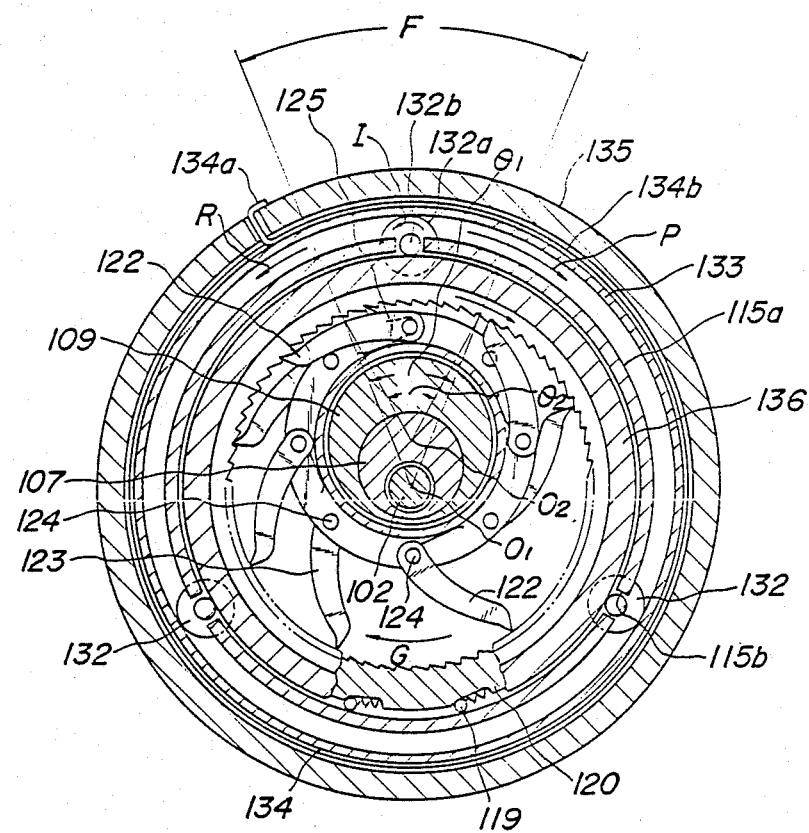

FIG_18b
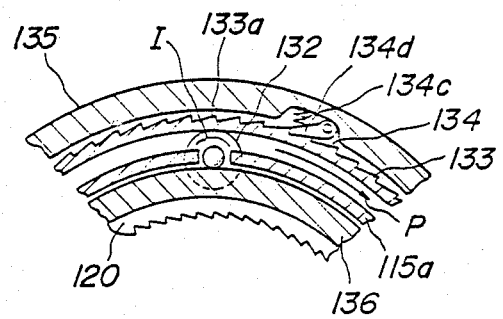
FIG_18c
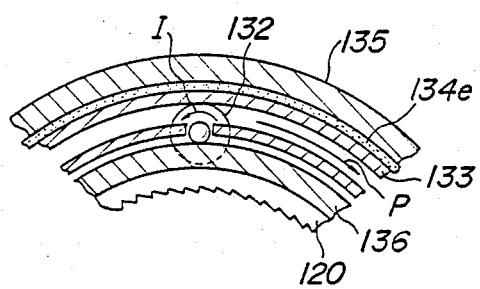

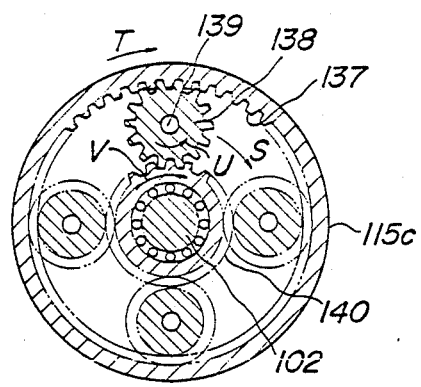
FIG_19

FIG_20
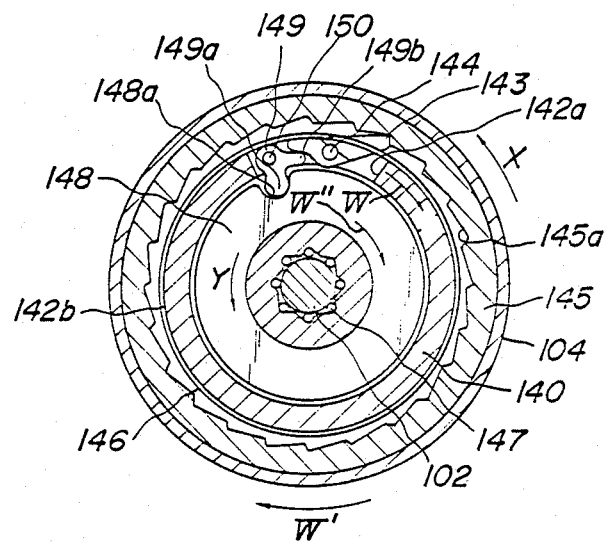
FIG_21
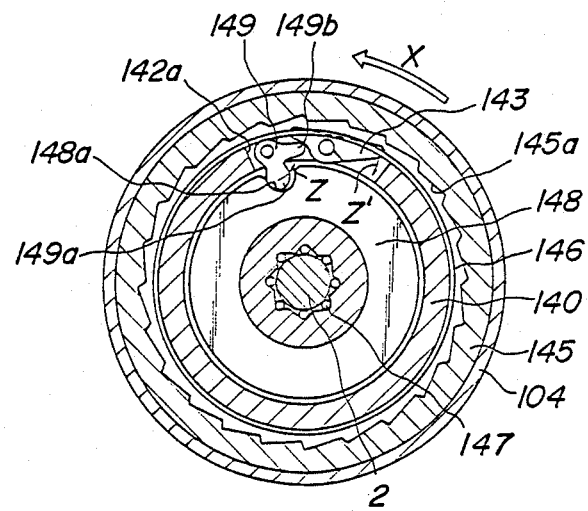

STEPLESS SPEED CHANGE DEVICE

BACKGROUND OF THE INVENTION

This invention relates to a stepless speed change device capable of changing its transmission speed and particularly suitable for use in a bicycle.

Such a kind of speed change device has been proposed, for example, as disclosed in Japanese Patent Application Publication No. 1,722/59.

With the prior art, however, shocks in transmission occur when the pawls taking part in transmission are switched. This results from a fact that there is a gap between tooth ends of a driving ratchet and a driven pawl which are about to take part in transmission, owing to difference in speed between them.

In the above Japanese Patent Application Publication, moreover, there are provided two stages of speed-up devices including ratchets and pawls. However, obtained speed-up ratios are often insufficient even if such two stages are used, because it is difficult for the transmission using ratchets and pawls to enlarge the speed-up ratio.

SUMMARY OF THE INVENTION

It is a primary object of the invention to provide an improved stepless speed change device which eliminates all the disadvantages of the prior art, that is, greatly reduces the pulsations and shocks in transmission in speed-up driving.

In order to achieve this object, a stepless speed change device according to the invention comprises internally toothed ratchet rings arranged in plural rows side by side in an axial direction on an inner circumference of a driving rotary member on an input side through one-way clutches interposed therebetween, a stationary ring fixed to a frame of a machine such as a bicycle and encircling the driving rotary member, a plurality of planet rollers rotatably fitted in said driving rotary member at plural locations so that when the driving rotary member is being rotated said planet rollers are revolved together with the driving rotary member and at the same time are rotated about their axes with the aid of frictional transmission between said stationary ring and said planet rollers and said internally toothed ratchet rings are rotated by the planet rollers with the aid of frictional transmission between said planet rollers and the internally toothed ratchet rings, and pawls in plural rows to engage ratchets of the internally toothed ratchet rings and having bottoms pivotally connected to an eccentric cam whose eccentricity relative to a center shaft is adjustable.

Resilient means are preferably provided in contact with the planet rollers to produce the frictional transmission between the stationary ring and the internally toothed ratchet rings respectively and the planet rollers.

In a preferred embodiment of the invention, each planet roller consists of a large diameter portion and small diameter portions extending from both sides of the large diameter portion, axes of these large and small diameter portions being aligned with an axis of the planet roller, and the large diameter portions being in contact with an inner circumference of the stationary ring, and the resilient means each consists of an outer ring and a resilient wire wound plural times on an inner circumference of the outer ring and about the internally toothed ratchet ring to which is fixed one end of the resilient wire, and outer circumferences of the outer rings are in contact with the small diameter portions of the planet rollers.

In another embodiment of the invention, the resilient means consist of inner rings and one-way clutch means, the inner rings fitted on opposite shoulders of said internally toothed ratchet rings and frictionally fixed thereto and being in contact with the small diameter portions of the planet rollers, and the one-way clutch means being interposed between the stationary ring and the large diameter portions of the planet rollers.

In a further embodiment of the invention, the one-way clutch means consists of an outer ring and a resilient wire wound plural times about the outer ring and on an inner circumference of the stationary ring to which is fixed one end of the resilient wire.

With this arrangement according to the invention, when the driving rotary member on the input side is rotated, the planet rollers are revolved and rotated about their axes with the aid of frictional transmission between the planet rollers and the stationary ring to rotate the internally toothed ratchet ring. The rotation of the internally toothed ratchet ring is rotated at a rotating speed higher than the rotation of the driving rotary member on the input side. Therefore, even if there are gaps between the ratchets and the pawls in changing the driving pawls, the ratchets immediately contact the pawls to eliminate the gaps with the aid of the increased speed of the ratchet rings, thereby preventing the shocks occurring in changing the driving pawls.

It is another object of the invention to provide a stepless speed change device which has a large speed-up ratio with less shocks and less noise in changing the driving pawls in speed-up driving and allows reverse rotations of pedals without causing undue forces acting on respective members even if the above shock preventing means is provided.

In order to achieve this object, according to the invention a planetary gear assembly is connected to a driven rotary member on an output side of the stepless speed change device, and the planetary gear assembly comprises a cylindrical pawl carrier rotatable with a sun gear of the assembly, a pawl pivotally connected in a notch formed in the cylindrical pawl carrier, a ratchet ring fixed to the driven rotary member and having internally toothed ratchets engaging an outer end of the pawl pivotally connected to the pawl carrier when the driven rotary member is being normally rotated, pawl urging means for normally urging the outer end of said pawl pivoted to the pawl carrier against the internally toothed ratchet of the ratchet ring, an irreversible cam fitted through a one-way clutch on the driven member, and a lever pawl acting on the pawl pivotally connected to the pawl carrier to disengage the pawl from the internally toothed ratchet of the ratchet ring when the driven rotary member is being rotated in a reverse direction.

In order that the invention may be more clearly understood, preferred embodiments will be described, by way of example, with reference to the accompanying drawings.

BRIEF DESCRIPTION OF THE DRAWINGS

FIG. 4 is a sectional view taken along the line IV—IV in FIG. 1;

FIG. 5 is a sectional view taken along the line V—V in FIG. 1;

FIG. 6 is a sectional view of a second embodiment of the invention;

FIG. 7 is a sectional view taken along the line VII—VII in FIG. 6;

FIG. 8 is a sectional view of a third embodiment of the invention;

FIG. 18a is a sectional view taken along the line XVIIIa—XVIIIa in FIG. 16;

FIG. 18b is a sectional view illustrating a modification of the one-way clutch shown in FIG. 18a;

FIG. 18c is a sectional view showing a further modification of the one-way clutch shown in FIG. 18a;

FIG. 19 is a sectional view taken along the line XIX—XIX in FIG. 16;

FIG. 20 is a sectional view taken along the line XX—XX in FIG. 16; and

FIG. 21 is a sectional view similar to FIG. 20 illustrating the operation of the jaw and lever jaw shown in FIG. 20.

DESCRIPTION OF THE PREFERRED EMBODIMENTS

Figure 1:
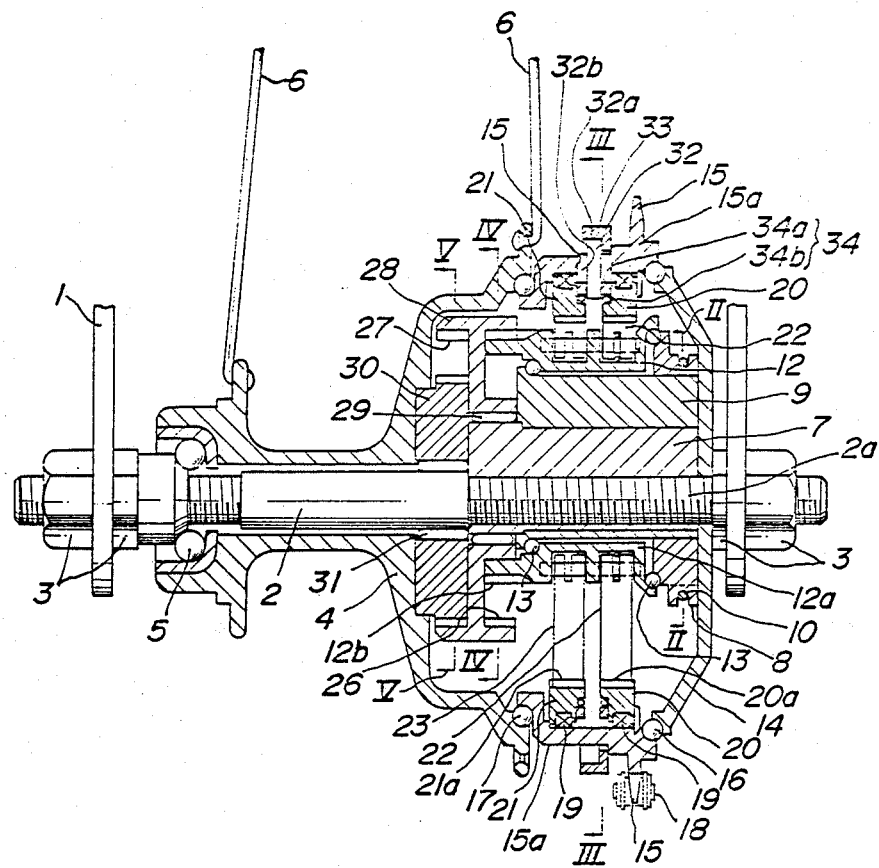
FIG. 1 is a sectional view of one embodiment of the invention.

FIGS. 1-5 illustrate a stepless speed change device of the embodiment of the invention, with chain stays 1 for a bicycle frame, a hub spindle 2 for a rear wheel fixed to the chain stays 1 by means of lock nuts 3, a rear wheel hub 4 rotatably mounted on the spindle 2 by means of bearings 5 and spokes 6.

Figure 2:
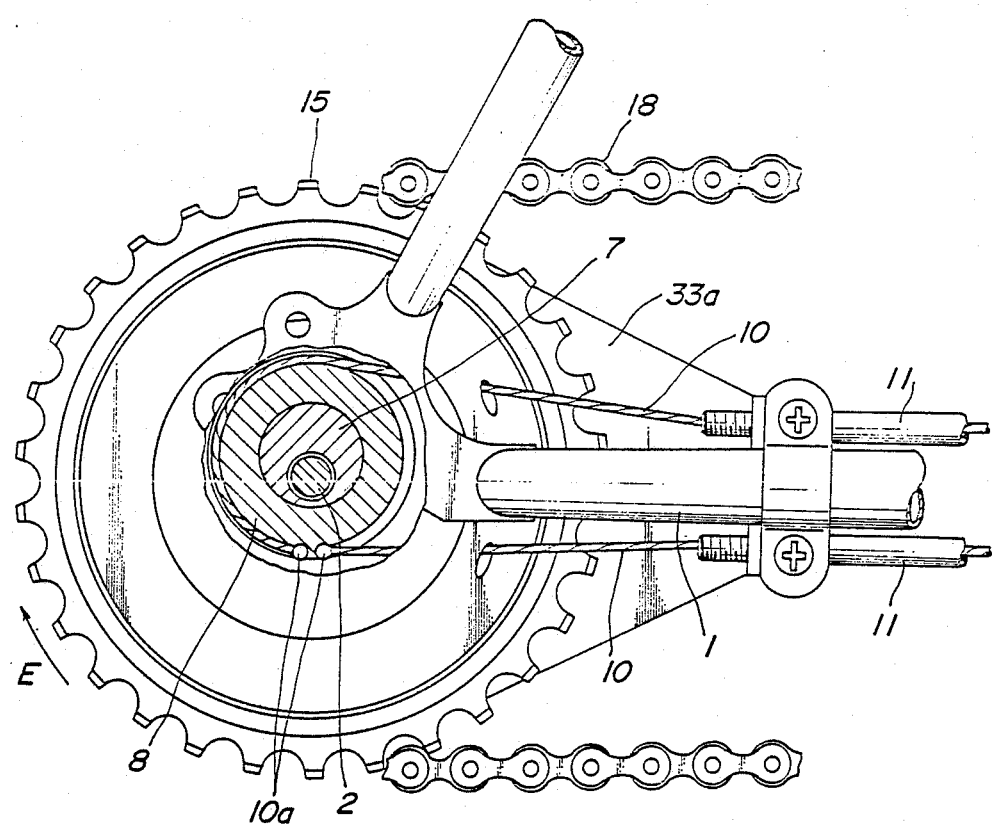
FIG. 2 is a side view taken along the line II—II in FIG. 1.

In this embodiment, the spindle 2 for the rear wheel is formed with a screw-threaded portion 2a to which is fixed an inner eccentric cam 7 threadedly engaged thereon. On the inner eccentric cam 7 is rotatably fitted an outer eccentric cam 9 integrally formed with a wire reel 8 about which is wound an operating wire 10 having ends 10a (FIG. 2). Reference numeral 11 denotes outer wires.

Moreover, a carrier 12 consists of a flanged cylinder 12a and a gear 12b. The flanged cylinder 12a is fitted on the outer eccentric cam 9 through bearings 13.

A dish-shaped casing 14 is fixed to the spindle 2 by means of the inner eccentric cam 7 and the lock nut 3. A sprocket 15 driving rotary member on an input side for the rear wheel includes a cylindrical portion 15a integral therewith and is rotatably arranged between the casing 14 and the rear wheel hub 4 with the aid of bearings 16 and 17.

In the cylindrical portion 15a of the sprocket 15, are arranged a plurality of rows (two rows in this embodiment) of internally toothed ratchet rings 20 and 21 side by side through one-way clutches 19 of the same number as that of the rows of the ratchet rings. The ratchet rings 20 and 21 are formed on their inner circumferences with ratchets 20a and 21a, respectively. A plurality (four in this embodiment) of pawls 22 and 23 in a plurality of rows are arranged so as to engage the ratchets 20a and 21a. Bottoms of the pawls 22 and 23 are pivotally connected to an outer circumference of the cylinder 12a of the carrier 12 by means of pins 24 such that the bottoms of the pawls 22 are positioned between the bottoms of the pawls 23 vice versa. Springs 25 always urge front ends of the pawls 22 and 23 against the ratchets 20a and 21a.

A transmission gear 28 comprises an internal gear 26 in mesh with the gear 12b of the carrier 12 and an internal gear 27 identical with the internal gear 26 in back-to-back relation and integral therewith. The transmission gear 28 is rotatably arranged on the inner eccentric cam 7 concentrically thereto through bearings 29. A gear 30 adapted to be in mesh with the internal gear 27 is fixed to the rear wheel hub 4 and is rotatably fitted on the hub spindle 2 through bearings 31.

Figure 3:
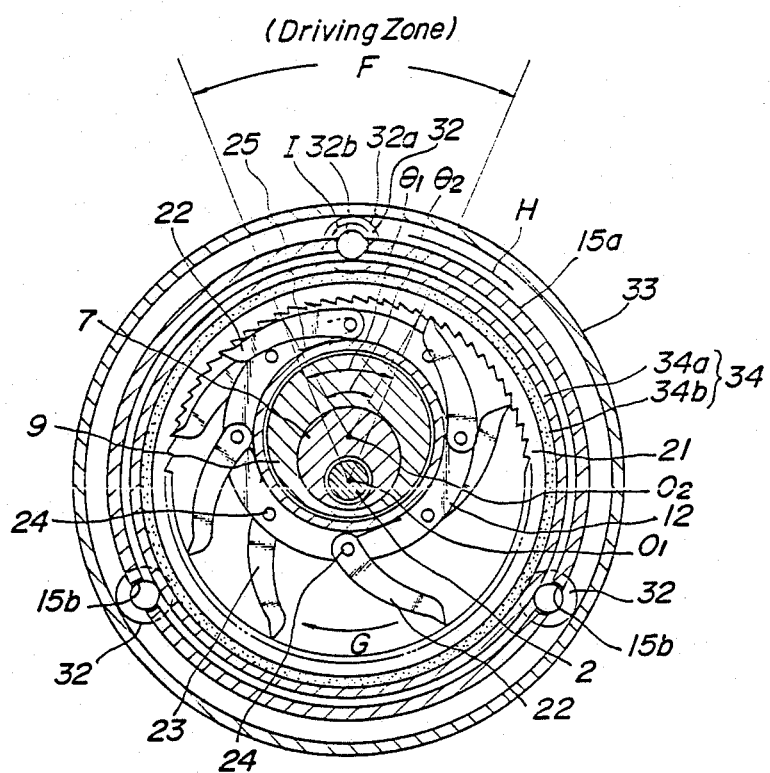
FIG. 3 is a sectional view as viewed from the line III—III in FIG. 1.

As shown in FIGS. 1 and 3, the cylinder 15a of the sprocket 15 as the driving rotary member on an input side is formed with notches 15b in its circumference at plural positions (three positions circumferentially equally divided in this embodiment). Planet rollers 32 each having a large diameter portion 32a and small diameter portions 32b extending from both sides of the large diameter portion 32a are loosely fitted rotatably in the notches 15b, respectively. A stationary ring 33 is fixed through a fixed plate 33a to the chain stay 1 as shown in FIG. 2, so that an inner surface of the stationary ring 33 is circumscribed on the large diameter portions 32a of the planet rollers 32.

Resilient rings 34 each consisting of a solid material such a spring steel ring 34a and an O-ring 34b made of, for example, an elastomer fitted in the spring steel ring 34a are fitted on opposite sides of the ratchet rings 20 and 21 and frictionally fixed thereto. The outer circumferences of the respective resilient rings 34 are fitted on the small diameter portions 32b of the planet rollers 32 so that the large diameter portions 32a of the planet rollers 32 are brought into contact with the inner surface of the stationary ring 33.

Although the resilient ring 34 is constructed by the two members in this embodiment, it may be made of a single member having an elasticity and a coefficient of friction or another material.

The operation of the device constructed as above described according to the invention will be explained hereinafter. First, a sequence of transmission will be explained. When a crank gear is rotated by a crank pedal (not shown), the rotation is transmitted to the sprocket 15 by a chain 18. The rotation of the sprocket 15 is further transmitted through the one-way clutches 19 to the ratchet rings 20 and 21 and then through the ratchets 20a and 21a of the ratchet rings 20 and 21, the pawls 22 and 23, and pins 24 to the carrier 12. The rotation of the carrier 12 and hence the gear 12b integral thereiwth causes the transmission gear 28 to rotate through the internal gear 26 in mesh with the gear 12b as shown in FIG. 4. Moreover, the rotation of the transmission gear 28 causes the gear 30 in mesh therewith to rotate as shown in FIG. 5. In this manner, the rear wheel hub 4 fixed to the gear 30 is rotated to drive a bicycle.

FIGS. 1-5 illustrate the outer eccentric cam 9 in the maximum eccentric position. When the outer eccentric cam 9 is rotated through 180° by operating the operating wire 10, an outer circumferential surface of the cam 9 becomes concentric to the spindle 2. When the outer eccentric cam 9 is concentric to the spindle 2, the sprocket 15 as the driving rotary member and the ratchet rings 20 and 21 become concentric to the spindle 2. Under such a condition, when the sprocket 15 as the driving rotary member is rotated in a direction shown by a arrow E in FIG. 2, the respective ratchet rings 20 and 21 and the pawls 22 and 23 are rotated in unison through and one-way clutches, so that the speed change ratio in this case is 1:1.

When the outer eccentric cam 9 is rotated by the operating wire 10 to the maximum eccentric position shown in the drawings, the rotation of the sprocket 15 in a direction shown by an arrow E is transmitted through the one-way clutches 19 to the ratchet rings 20 and 21. The ratchet ring 20 transmits the rotation through the pawl 22 to the carrier 12, while the ratchet ring 21 transmits the rotation through the pawl 23 to the carrier 12.

When the outer eccentric cam 9 is eccentric, the speed-up ratio by the pawl positioned in the driving zone F in FIG. 3 is the largest. (As the pawls are eight, the driving zone F is a sector having an angle of 45° which is obtained by dividing 360° by eight.) Accordingly, the rotating speed of carrier 12 as the driven rotary member is increased by the pawls. The other pawls are rotated sliding in a direction shown by an arrow G relative to the respective ratchets 20a and 21a of the ratchet rings 20 and 21.

When the pawl moves out of the driving zone F and the next pawl enters the driving zone F, then the rotating speed of the carrier is increased by the next pawl. In this manner, the pawls for transmitting the rotation progressively change in succession.

In this case, the speed change ratio (speed-up ratio) is a ratio of an angle $\theta_1$ of a driving zone of a pawl around the center $O_1$ of the spindle 2 for the rear wheel to an angle $\theta_2$ of a driving zone of a pawl around the center $O_2$ of the outer eccentric cam 9.

The functions of the planet rollers 32 and the resilient ring 34 will be explained hereinafter, which are subject features of the device according to the invention.

When the sprocket 15 as the driving rotary member on the input side is rotated in the direction shown by the arrow E, the planet rollers 32 revolve in a direction shown by an arrow H in FIG. 3, so that the planet rollers 32 are rotated about their axes in a direction shown by an arrow I owing to frictional resistance between the large diameter portions 32a of the planet rollers 32 and the stationary ring 33 forcedly abutting against each other. The revolution of the planet rollers 32 about the center $O_1$ and the rotation about their axes are transmitted through the small diameter portions 32b of the planet rollers 32 to the rings 34a of the resilient rings 34, so that the O-rings 34b together with the rings 34a are rotated.

In this case, the resilient ring 34 is rotated at a rotating speed approximately 1.5 times higher than that of the sprocket 15 on the input side, so that the internally toothed ratchet rings 20 and 21 frictionally in contact with the resilient ring 34 are also rotated at such an increased rotating speed. Therefore, even if there are gaps between the ratchets 20a and 21a and the pawls 22 and 23 in exchanging the driving pawls, the ratchets 20a and 21a immediately contact the pawls 22 and 23 to eliminate the gaps with the aid of the increased speed of the ratchet rings 20 and 21.

Moreover, when the pawls 22 and 23 are being driven by the ratchets 20a and 21a completely engaging the pawls, the planet rollers 32 suitably slip relative to the members in contact therewith to absorb the difference in speed between the respective members.

The device according to the invention comprises the planet rollers and the resilient ring in the stepless speed change device, thereby preventing the shocks caused in exchanging the driven pawls. Therefore, the stepless speed change device according to the invention achieves smooth rotation with less shocks caused during its operation.

FIGS. 6 and 7 illustrate a second embodiment of the invention, wherein like components have been designated by the same reference numerals as those used in the previous embodiment. In this embodiment, instead of the planet rollers 32, cylindrical planet rollers 42 are loosely fitted rotatably in notches 15b formed at plural positions in a circumference of a cylinder 15a of a sprocket 15 as a driving rotary member on the input side. In this embodiment, the plural positions of the notches are three positions circumferentially equally divided. A stationary ring 33 is fixed through a fixed plate 33a to a chain stay 1 as shown in FIG. 2, so that an inner surface of the stationary ring 33 is circumscribed on the planet rollers 42.

Speed-up rings or resilient rings 44 each having an O-ring 45 fitted in the inner circumference of the speed-up ring or resilient ring 44 are fitted on opposite sides of the ratchet rings 20 and 21 and frictionally fixed thereto. Outer circumferences of the respective speed-up rings 44 are fitted on the planet rollers 42 so that the planet rollers 42 are brought into contact with the inner surface of the stationary ring 33. Reference numeral 36 denotes a separate ring interposed between internally toothed ratchet rings 20 and 21.

The device thus constructed as above described operates in the same manner as the operation of the previous embodiment with exception of the functions of the cylindrical planet rollers 42 and the speed-up rings 44.

When the sprocket 15 as the driving rotary member on the input side is rotated in the direction shown by the arrow E, the planet rollers 42 revolve in a direction shown by an arrow H in FIG. 7, so that the planet rollers 42 are rotated about their axes in a direction shown by an arrow I owing to frictional resistance between the planet rollers 42 and the stationary ring 33 forcedly abutting against each other. The revolution of the planet rollers 42 about the center $O_1$ and the rotation about their axes are transmitted through the planet rollers 42 to the speed-up rings 44, so that the O-rings 45 together with the speed-up rings 44 are rotated.

In this case, the speed-up rings 44 are rotated at a rotating speed greater than that of the sprocket 15 on the input side, so that the internally toothed ratchet rings 20 and 21 frictionally in contact with the speed-up rings 44 through the O-rings 45 are also rotated at such an increased rotating speed. Therefore, even if there are gaps between the ratchets 20a and 21a and the pawls 22 and 23 in exchanging the driven pawls, the ratchets 20a and 21a immediately contact the pawls 22 and 23 to eliminate the gaps with the aid of the increased speed of the ratchet rings 20 and 21.

Moreover, when the pawls 22 and 23 are being driving by the ratchets 20a and 21a completely engaging the pawls, the planet rollers 42 suitably slip relative to the members in contact therewith to absorb the difference in speed between the respective members.

Figure 9:
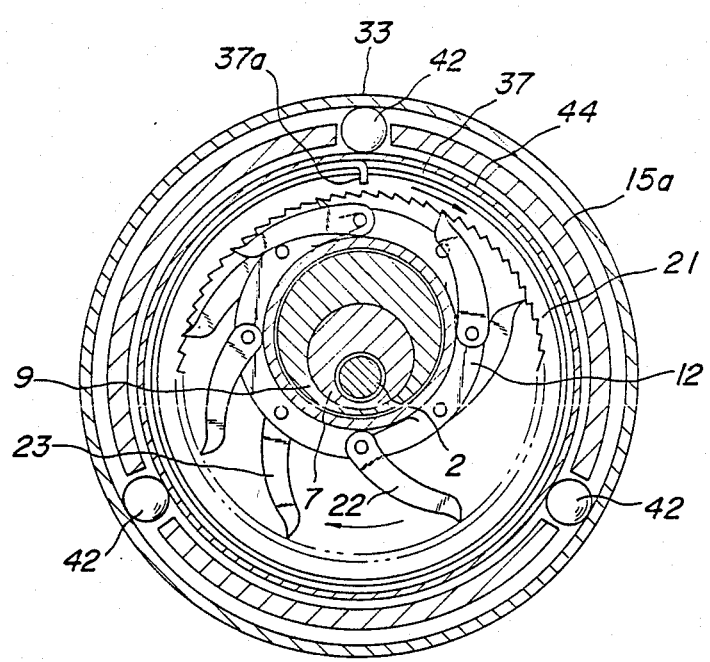
FIG. 9 is a sectional view taken along the line IX—IX in FIG. 8.

FIGS. 8 and 9 illustrate a third embodiment of the invention wherein like components have been designated by the same reference numerals as those in the previous embodiments. This embodiment is similar to the second embodiment with the exception of one-way clutch springs 37 instead of the O-rings 45.

As shown in FIG. 9, the one-way clutch springs 37 are made of spring steel wires wound plural times (two times in this embodiment) on inner circumferences of speed-up rings 44 and about shoulders of internally toothed ratchet rings 20 and 21, respectively. One end 37a of each one-way clutch spring 37 is anchored in internally toothed ratchet ring 20 or 21, and the end of each spring 37 is free.

With this arrangement, when the speed-up rings 44 are rotated in a direction shown by an arrow J in FIG. 9, the free ends of the one-way clutch springs 37 are forced into positions increasing diameters of turns of the one-way clutch springs 37 by friction between the speed-up rings 44 and the free ends of the one-way clutch springs 37, so that the rotation of the speed-up rings 44 in the direction J is transmitted to the internally toothed ratchet rings 20 and 21. On the other hand, the rotation of the speed-up rings 44 in a direction opposite to the direction J is not transmitted to the ratchet rings 20 and 21, because the free ends of the one-way clutch springs 37 are forced into positions decreasing the diameters of the turns of the one-way clutch springs 37 away from the inner circumferences of the speed-up rings 44.

Accordingly, the operation of the device of the third embodiment is substantially the same as that of the second embodiment, which will not be described in further detail.

Figure 10:
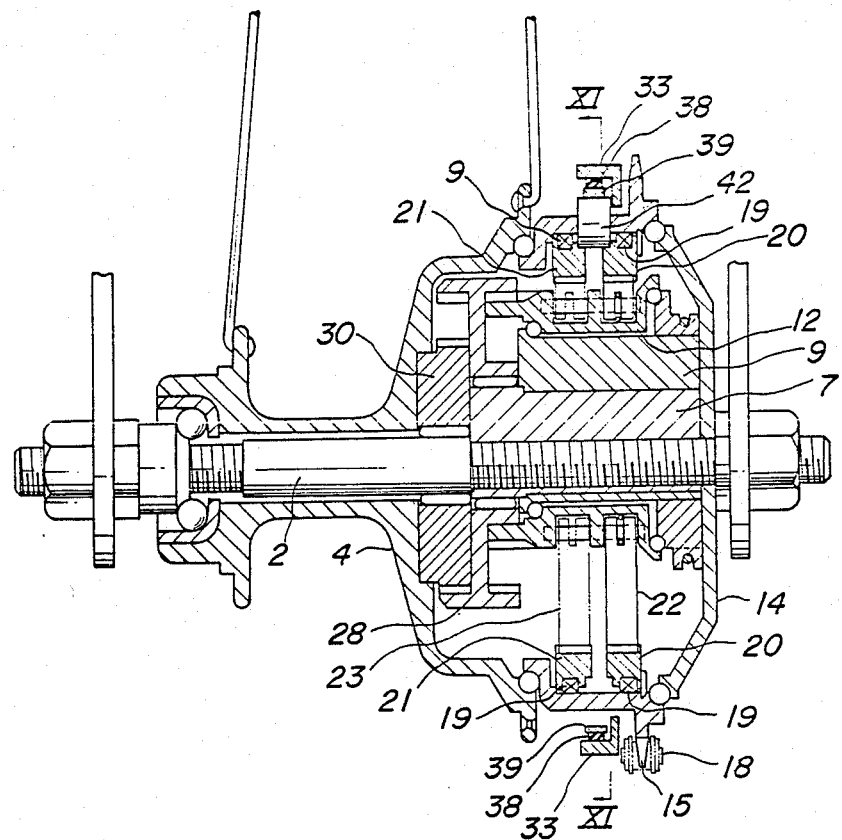
FIG. 10 is a sectional view of a fourth embodiment of the invention.
Figure 11:
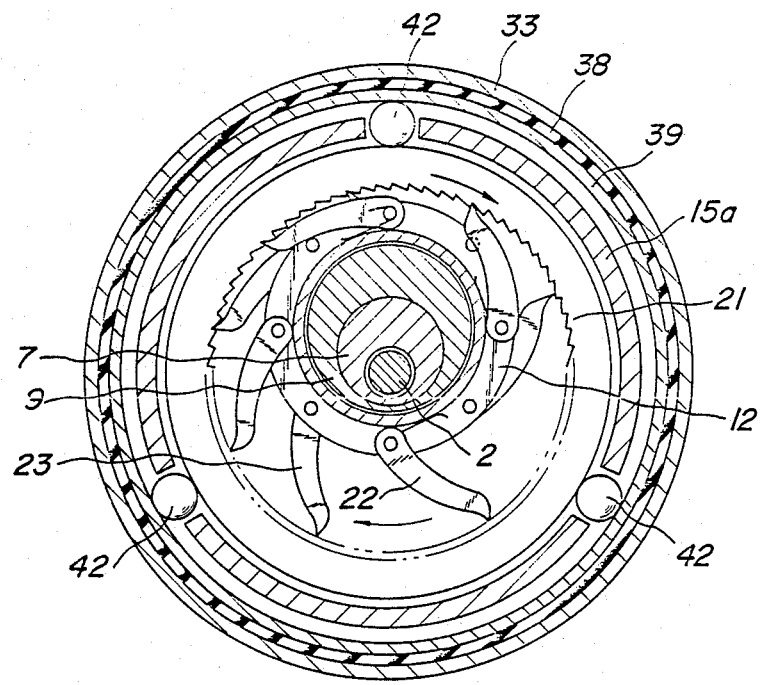
FIG. 11 is a sectional view taken along the line XI—XI in FIG. 10.
Figure 12:
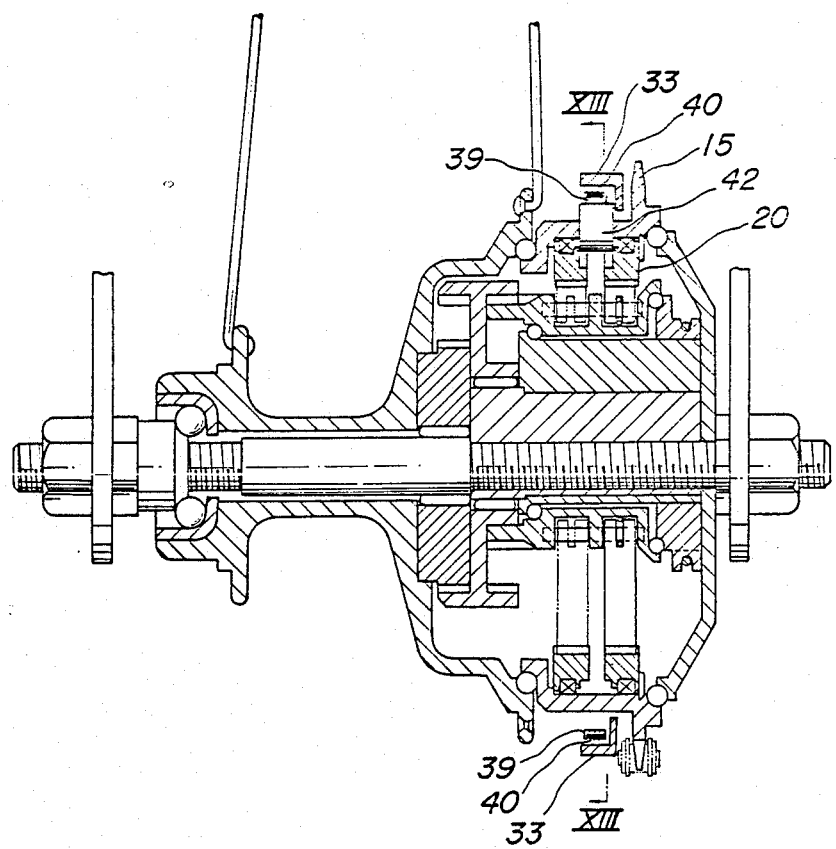
FIG. 12 is a sectional view of a fifth embodiment of the invention.
Figure 13:
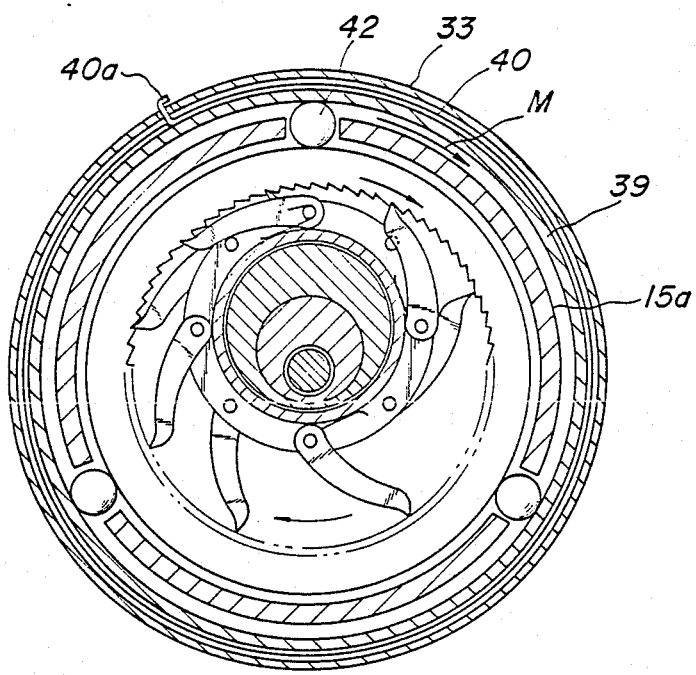
FIG. 13 is a sectional view taken along the line XIII—XIII in FIG. 12.

FIGS. 10 and 11 illustrate a fourth embodiment of the invention and FIGS. 12 and 13 illustrate a fifth embodiment of the invention wherein like components have been designated by the same reference numerals as those in the previous embodiments. In these embodiments, members giving friction forces to planet rollers 42 are provided on inner surfaces of stationary rings 33.

In the embodiment shown in FIGS. 10 and 11, a resilient ring 38 made of an elastomer such as a rubber is fitted in an inner surface of the stationary ring 33. An outer ring 39 made of a spring steel is press-fitted in an inner circumference of the resilient ring 38. Cylindrical planet rollers 42 are interposed between an inner surface of the outer ring 39 and shoulders of the internally toothed ratchet rings 20 and 21. With this arrangement, when a sprocket 15 as a driving rotary body on the input side is rotated, the planet rollers 42 are revolved about a rear wheel spindle 2 and rotated about their axes. In this manner, the rotation of an increased speed is transmitted to the internally toothed ratchet rings 20 and 21. Such an operation is substantially the same as that of the previous embodiment and will not be described in more detail.

In FIGS. 12 and 13, a one-way clutch spring 40 is used instead of the resilient ring 38. The one-way clutch spring 40 is made of a spring steel wire wound plural times (two times in this embodiment) on an inner circumference of a stationary ring 33 and an outer circumference of an outer ring 39. One end 40a of the one-way clutch spring 40 is anchored in the stationary ring 33. With this arrangement, rotation of the outer ring 39 in a direction shown by an arrow M in FIG. 13 is obstructed, but rotation of the outer ring 39 in a direction opposite thereto is allowed.

In this case, therefore, when a sprocket 15 as a driving rotary member on an input side is rotated in a direction shown by an arrow M in FIG. 13, the planet rollers 42 are revolved about a rear wheel spindle and rotated about their axes, so that the rotation of an increased speed is transmitted to internally toothed ratchet rings 20 and 21. The operation of the device of this embodiment is substantially the same as that of the previous embodiment and will not be explained in more detail.

Figure 14:
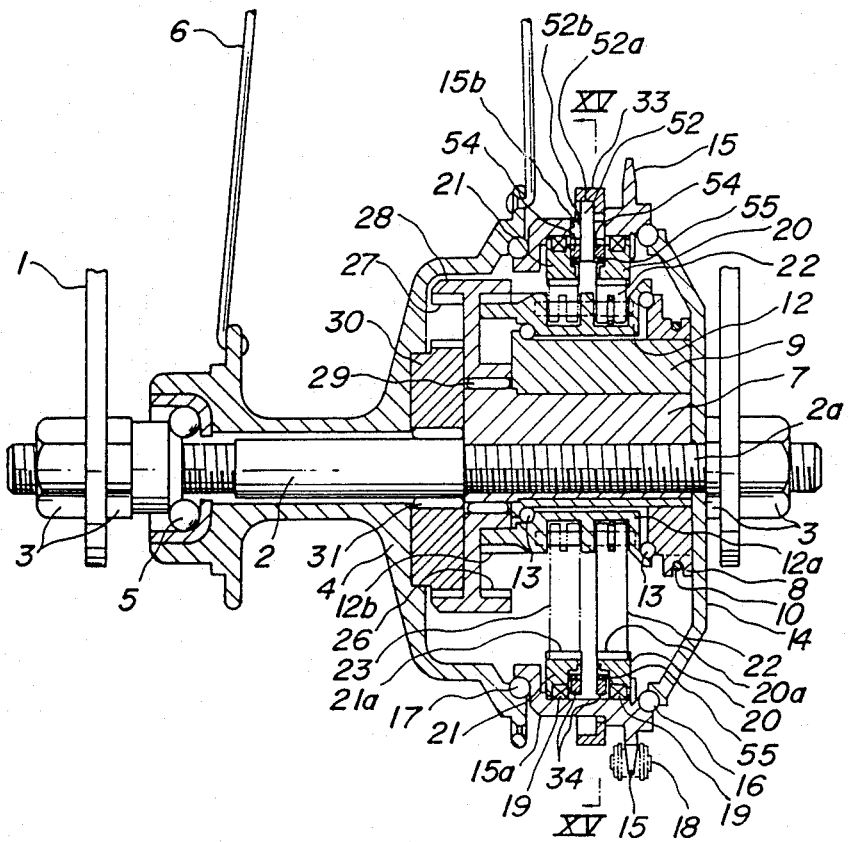
FIG. 14 is a sectional view of a sixth embodiment of the invention.
Figure 15:
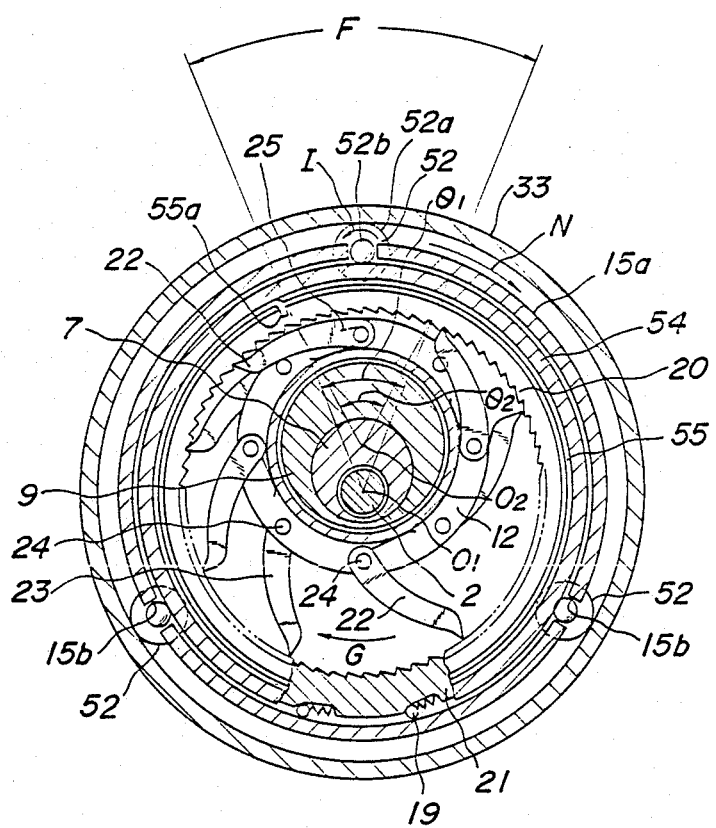
FIG. 15 is a sectional view taken along the line XV—XV in FIG. 14.

FIGS. 14 and 15 illustrate a sixth embodiment of the invention, wherein like components have been designated by the same reference numerals as those in the previous embodiments.

Speed-up rings or resilient rings 54 made of a spring steel are fitted on opposite shoulders of internally toothed ratchet rings 20 and 21 through one-way clutches 55. Outer circumferences of the speed-up rings 54 are fitted on small diameter portions 52b of planet rollers 52, so that large diameter portions 52a of the planet rollers 52 are brought into contact with an inner circumference of a stationary ring 33.

In this embodiment, as shown in FIG. 15, steel wires 55 are wound plural times in an inner circumference of the speed-up ring 54 and on shoulders of the internally toothed ratchet rings 20 and 21, and one end 55a of each steel wire is anchored in ratchet ring 20 or 21 to form the one-way clutches 55. With this arrangement, it will be easily understood that the rotation of the speed-up rings 54 in a direction shown by an arrow N is transmitted to the ratchet rings 20 and 21, but the rotation of the speed-up rings 54 in a direction opposite to the direction N is not transmitted to the ratchet rings 20 and 21.

When the sprocket 15 as the driving rotary member on the input side is rotated in the direction shown by the arrow E in FIG. 2, the planet rollers 52 are revolved in the direction shown by an arrow N in FIG. 15, so that the planet rollers 52 are rotated about their axes in a direction shown by an arrow I owing to frictional resistance between the large diameter portions 52a of the planet rollers 52 and the stationary ring 33 forcedly abutting against each other. The revolution of the planet rollers 52 about the center $O_1$ and the rotation about their axes are transmitted through the small diameter portions 52b of the planet rollers 52 to the speed-up ring 54. The rotation of the speed-up ring 54 is transmitted through the one-way clutches 55 to the internally toothed ratchet rings 20 and 21. In this case, the speed-up ring 54 is rotated at a rotating speed approximately 1.5 times higher than that of the sprocket 15 on the input side, so that the internally toothed ratchet rings 20 and 21 driven through the one-way clutches 55 by the speed-up ring 54 are also rotated at such an increased rotating speed.

FIGS. 16–21 illustrate a seventh embodiment of the invention. Only different parts from those of the previous embodiments will be explained referring to FIGS. 16–21, wherein substantially like components have been designated by reference numerals added with 100 to the same reference numerals in the previous embodiments although including a few exceptions.

On an inner eccentric cam 107 is rotatably fitted an outer eccentric cam 109 integrally formed with a worm-gear 108 which is in mesh with a worm 110. An inner wire 111a having an outer wire 111b is fixed to the worm 108.

Figure 16:
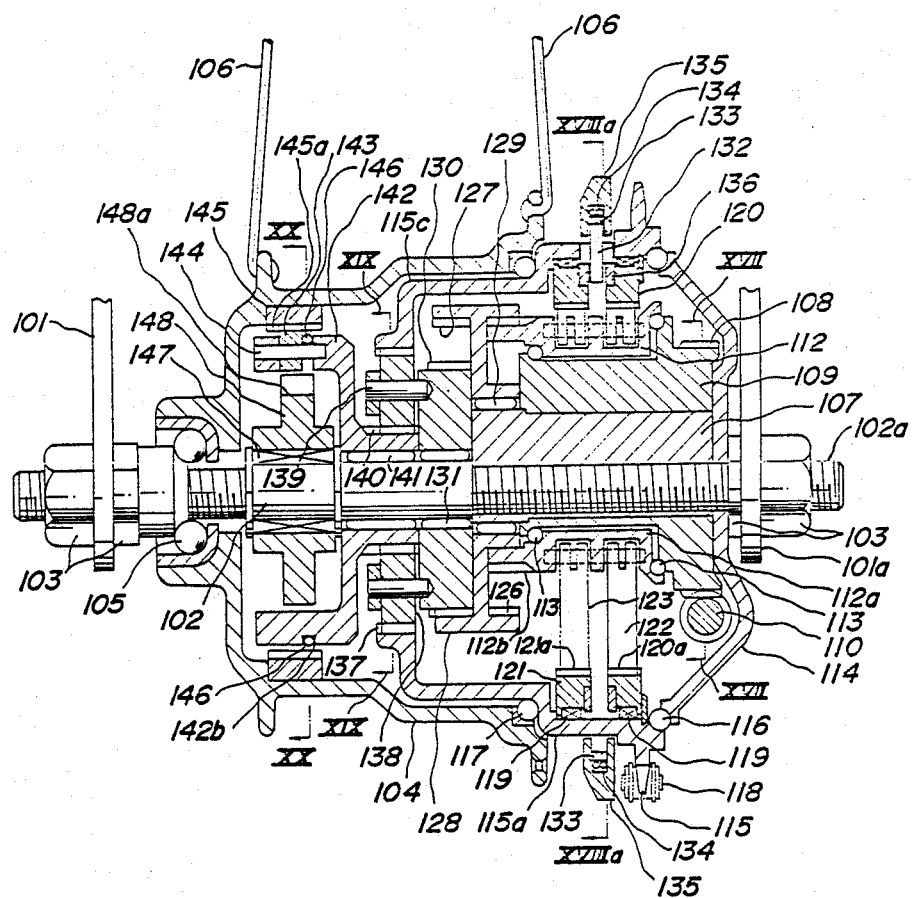
FIG. 16 is a sectional view of a seventh embodiment of the invention.
Figure 17:
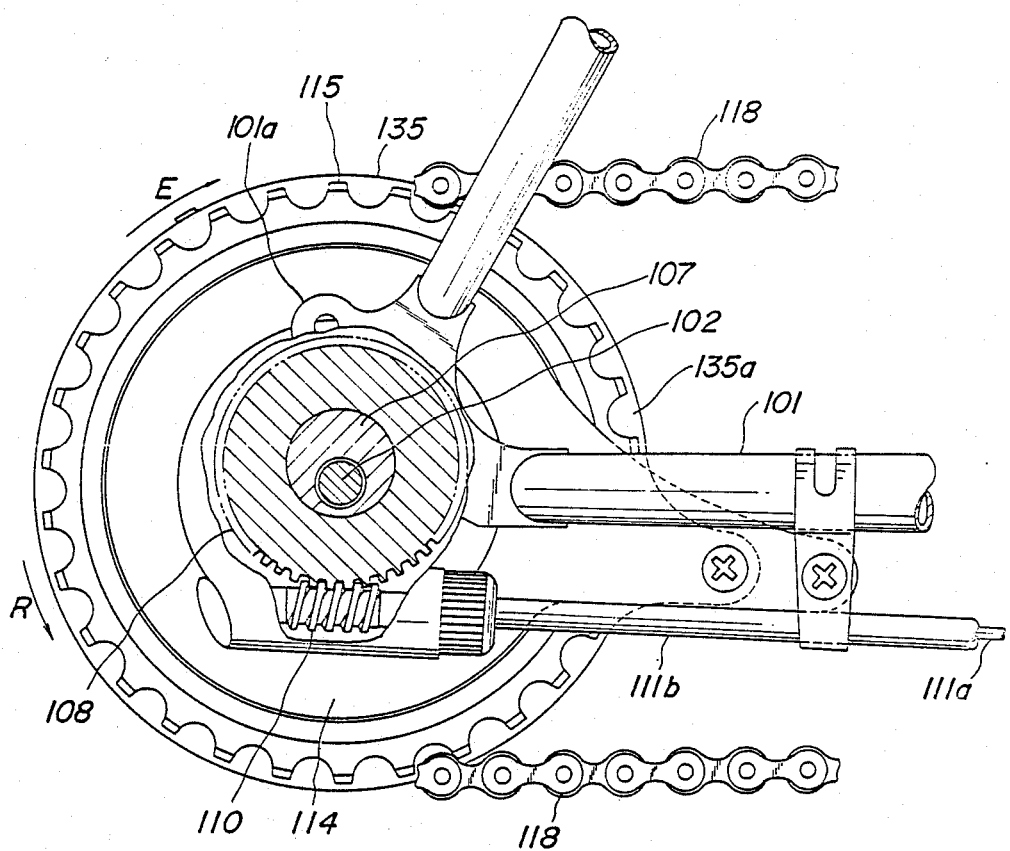
FIG. 17 is a side view as viewed from the line XVII—XVII in FIG. 16.

As shown in FIGS. 16 and 18a, a cylinder 115a of a sprocket 115 as a driving rotary member on an input side is formed with notches 115b in its circumference at plural positions (three positions circumferentially equally divided in this embodiment). Planet rollers 132 each having a large diameter portion 132a and small diameter portions 132b extending from both sides of the large diameter portion 132a are loosely fitted rotatably in the notches 115b, respectively. An outer ring 133 is fitted through a one-way clutch 134 inside of a stationary ring 135, so that the outer ring 133 is circumscribed on the large diameter portions 132a of the planet rollers 132. The stationary ring 135 is fixed through a fixed plate 135a to a chain stay 1 as shown in FIG. 17.

Referring to FIGS. 16 and 18a, a spring steel wire 134b is wound plural times (two times in this embodiment) about an outer circumference of the outer ring 133 and one end 134a of the wire is anchored in the stationary ring 135 to form the one-way clutch spring 134. With this arrangement, the rotation of the outer ring 133 in a direction shown by an arrow P in FIG. 18a is prevented, while the rotation of the outer ring 133 in a direction opposite to the direction P is allowed.

Referring to FIG. 18b illustrating a slight modification of the one-way clutch, the outer ring 133 is formed on its outer circumference with ratchets 133a and a pawl 134c is pivotally connected to the stationary ring 135 and urged against one of the ratchets 133a by means of a spring 134d to form a one-way clutch. In this case, rotation of the outer ring 133 in the direction P is obstructed, but rotation of the outer ring 133 in the opposite direction is allowed.

In FIG. 18c illustrating another modification, a resilient ring 134e made of an elastomer such as a rubber or the like is press-fitted between the outer ring 133 and the stationary ring 135. In this case, although the resilient ring 134e does not effect the function of a complete one-way clutch, the rotation of the outer ring 133 in the direction P is obstructed to a certain extent with the aid of frictional force of the resilient ring 134e, and the rotation of the outer ring 133 in the opposite direction is allowed, though there is some frictional resistance. Accordingly, the arrangement shown in FIG. 18c may be employed as the case may be.

Inner rings 136 are fitted on opposite shoulders of internally toothed ratchet rings 120 and 121 and frictionally fixed thereto, respectively. Outer circumferences of the inner rings 136 are fitted on small diameter portions 132b of the planet rollers 132, so that the large diameter portions 132a of the planet rollers 132 are brought into contact with an inner circumference of the outer ring 133 to form a relay shock preventing means.

Moreover, as shown in FIG. 16, the cylinder 115a of the sprocket 115 as the driving rotary member on the input side extends further and the extended cylinder 115c is formed at the end with an internal gear 137 (FIG. 19). A plurality (four in this embodiment) of planetary gears 138 are rotatably supported by shafts 139 planted in one side of the gear 130 as a carrier of a planetary gear and are adapted to be in mesh with a sun gear 140 which is rotatably fitted through bearings 141 on a rear wheel spindle 102 to form a planetary gear type speed increasing device.

FIGS. 16, 20 and 21 illustrate a reverse input allowing device for the stepless speed change device according to the invention. The sun gear 140 is integrally formed with a cylindrical pawl carrier 132 whose cylindrical portion is formed with a notch 142a. A pawl 143 is pivotally supported by a pin 144 so as to be rockable in the notch 142a. An outward extending end of the pawl 143 is adapted in normal running of a bicycle to engage one of internally toothed ratchets 145a of a ratchet ring 145 which is fixed to a rear wheel hub 104. The pawl carrier 142 is formed in its outer surface with an annular groove 142b in which is fitted a pawl spring 146 for normally urging the outer end of the pawl 143 into contact with the internally toothed rachet 145a.

An irreversible cam 158 is fitted through a one-way clutch 147 on the rear wheel hub 102 on the left side of the sun gear 140 as viewed in FIG. 16. The irreversible cam 148 is formed in its outer circumference with a recess 148a in which is engaged one end 149a of a substantially L-shaped lever pawl 149 pivotally connected by a shaft 150 to the pawl carrier 140. The other end 149b of the lever pawl 149 is adapted to engage an inside of an inner end of the pawl 143. The reverse input allowing device is constructed in this manner.

The operation of the device constructed as above described according to the invention will be explained hereinafter. When a crank gear is rotated by a crank pedal (not shown), the rotation is transmitted to the sprocket 115 by a chain 118 and the rotation of the sprocket 115 is transmitted through the various members to the gear 130. Such a transmission is similar to those in the previous embodiments.

FIGS. 16-18a, b and c illustrate the outer eccentric cam 109 in the maximum eccentric position. When the worm 110 is rotated by the inner wire 111a to rotate the worm-gear 108 in mesh with the worm 110, the outer eccentric cam 109 is rotated. When the eccentric cam 198 is rotated through 180° from the position shown in the drawings, an outer circumferential surface of the cam 109 becomes concentric to the rear wheel spindle 102. In this case, the sprocket 115 as the driving rotary member and the ratchet rings 120 and 121 becomes concentric to the spindle 102. Under such a condition, when the sprocket 115 as the driving rotary member is rotated in a direction shown by an arrow E in FIG. 17, the respective ratchet rings 120 and 121 and the pawls 122 and 123 are rotated in unison through the one-way clutches 119, so that the speed change ratio in this case is 1:1.

When the outer eccentric cam 109 is rotated by the inner wire 11a to the maximum eccentric position shown in the drawings, the rotation of the sprocket 115 in a direction shown by an arrow E is transmitted through the one-way clutch 119 to the ratchet rings 120 and 121. The ratchet ring 120 transmits the rotation through the pawls 122 to the carrier 112, while the ratchet ring 121 transmits the rotation through the pawl 123 to the carrier 112.

When the outer eccentric cam 198 is eccentric, the speed-up ratio by the pawl positioned in the driving zone F in FIG. 18a is the largest. (As the pawls are eight, the driving zone F is a sector having an angle of 45° which is obtained by dividing 360° by eight.) Accordingly, the rotating speed of carrier 112 as the driven rotary member is incrased by the pawls. The other pawls are rotated sliding in a direction shown by an arrow G relative to the respective ratchets 120a and 121a of the ratchet rings 120 and 121.

When the pawl moves out of the driving zone F and the next pawl enters the driving zone F, then the rotating speed of the carrier is increased by the next pawl. In this manner, the pawls for transmitting the rotation progressively change in succession.

In this case, the speed change ratio (speed-up ratio) is a ratio of an angle $\theta_1$ of the driving zone of a pawl around the center $O_1$ of the spindle 2 for the rear wheel to an angle $\theta_1$ of a driving zone of a pawl around the center $O_2$ of the outer eccentric cam 109.

The functions of the planet rollers 132 will be explained hereinafter.

When the sprocket 115 as the driving rotary member on the input side is rotated in the direction shown by the arrow E in FIG. 17, the planet rollers 132 revolve in a direction shown by an arrow P in FIG. 18a, so that the planet rollers 132 are rotated about their axes in a direction shown by an arrow I owing to frictional resistance between the large diameter portions 132a of the planet rollers 32 and the outer ring 133 forcedly abutting against each other. In this case, the outer ring 133 is fixed relative to the stationary ring 135 by means of the one-way clutch 134. The revolution of the planet rollers 132 about the center $O_1$ and the rotation about their axes are transmitted through the small diameter portions 132b of the planet rollers 132 to the inner rings 136. In this case, the inner rings 136 are rotated at a rotating speed approximately 1.5 times higher than that of the sprocket 15 on the input side, so that the internally toothed ratchet rings 120 and 121 frictionally in contact with the inner ring 136 are also rotated at such an increased rotating speed. Therefore, even if there are gaps between the ratchets 120a and 121a and the pawls 122 and 123 in exchanging the driven pawls, the ratchets 120a and 121a immediately contact the pawls 122 and 123 to eliminate the gaps with the aid of the increased speed of the ratchet rings 120 and 121.

Moreover, when the pawls 122 and 123 are being driven by the ratchets 120a and 121a completely engaging the pawls, the planet rollers 132 suitably slip relative to the members in contact therewith to absorb the difference in speed between the respective members.

When the gear 130 as a planetary carrier as above described is rotated in a direction shown by an arrow Q in FIG. 5, the planetary gears 138 are revolved through the shafts 139 in a direction shown by an arrow S in FIG. 19. At this time, as the inner gear 137 together with the sprocket 115 is rotated in a direction shown by an arrow T at a rotating speed slower than the revolving speed of the planetary gears 138 in the direction S, the planetary gears 138 are rotated about their axes in a direction shown by an arrow U. Therefore, the sun gear 140 is rotated at an increased rotating speed in a direction shown by an arrow V. When the sun gear 140 is rotated, the pawl carrier 142 is rotated in a direction shown by an arrow W, so that the rear wheel hub 104 is rotated through the pin 144, the pawl 143, the internally toothed ratchet 145a and the ratchet ring 145 in the same direction W' as W to drive the bicycle.

In this case, moreover, when the pawl carrier 140 is rotated in the direction shown by the arrow W, the irreversible cam 148 is also rotated together therewith through the lever pawl 149 in the direction W". Such a rotation of the irreversible cam 148 is allowed by the one-way clutch 147.

On the other hand, when the rear wheel hub 104 is rotated in a direction shown by an arrow X by retracting the bicycle backward, or the bicycle is supplied with reverse input, the ratchet ring 145 is also rotated in a direction shown by an arrow X in FIG. 20, so that the pawl carrier 140 also tends to rotate in the direction X through the pawl 143 and the pin 144. As a result, the irreversible cam 148 tends to rotate through the lever pawl 149 in a reverse direction shown by an arrow Y. However, as the irreversible cam 148 does not rotate owing to the action of the one-way clutch 147, the lever pawl 149 having one end 149a engaging in the recess 148a of the irreversible cam 148 is rotated in a direction Z shown in FIG. 21, with the result that the inner end of the pawl 143 is radially outwardly moved out of the notch 142a of the cylindrical pawl carrier 142 against the force of the pawl spring 146 by the other end 149b of the lever pawl 149. Therefore, the outer end of the pawl 143 is rotated in a direction shown by an arrow Z' so as to disengage from the internally toothed ratchet 145a, so that the rear wheel hub 104 is freely rotated in a direction shown by an arrow X in FIG. 21. Accordingly, the reverse input is not transmitted to the transmission capable of increasing and changing the speed to be transmitted.

A cyclist on a bicycle often presses pedals in a reverse rotating direction. According to the invention, as the outer ring 133 is fitted through the one-way clutch 134 in the inner circumference of the stationary ring 135 and the large diameter portions 132a of the planet rollers 132 are forced against the inner circumference of the outer ring 133, the outer ring 133 is freely rotated in a direction shown by an arrow R in FIG. 17 or FIG. 18a with the aid of the one-way clutch 134, even if the sprocket 115 and its cylinder 115 are rotated in the direction R. Accordingly, the outer ring 133 is geared with the planet rollers 132 without being subjected to undue forces. According to this embodiment, therefore, even if the pedals of a bicycle are rotated in a reverse direction, it does not cause any large resistance and does not give any undue force on the device, so that the durability of the device is greatly improved.

According to this embodiment, a stepless speed change device including a ratchet and pawls is combined with a planetary gear type speed-up device having a large speed-up ratio to obtain a stepless speed change device having a large speed-up ratio.

The stepless speed change device including ratchets and pawls of the prior art would be prone to shocks and noise, and particularly the device having two stages of the ratchets and pawls is likely to amplify the shocks and noise. In contrast therewith, the stepless speed change device according to this embodiment comprises the relay shock preventing mechanism including planet rollers in the first stage stepless speed change device, and the second stage stepless speed change device is constructed by a planetary gear type speed-up device, thereby considerably decreasing the relay shocks and noise in increasing speed.

According to this embodiment, moreover, even if pedals of a bicycle are pressed in a reverse direction, any large resistance does not occur in the device and any undue force does not act on the device, thereby improving the durability of the device.

It is further understood by those skilled in the art that the foregoing description is that of preferred embodiments of the disclosed devices and that various changes and modifications may be made in the invention without departing from the spirit and scope thereof.

What is claimed is:

1. A stepless speed change device comprising internally toothed ratchet rings arranged in plural rows side by side in an axial direction on an inner circumference of a driving rotary member with a one-way clutches interposed between said ratchet rings and said driving rotary member, a stationary ring fixed to a frame of a machine such as a bicycle and encircling the driving rotary member, a plurality of planet rollers rotatably fitted in said driving rotary member at plural locations so that when the drivng rotary member is being rotated said planet rollers are revolved together with the driving rotary member and at the same time are rotated about their axes with the aid of frictional transmission between said stationary ring and said planet rollers and said internally toothed ratchet rings are rotated by the planet rollers with the aid of frictional transmission between said planet rollers and the internally toothed ratchet rings, and pawls in plural rows to engage ratchets of the internally toothed ratchet rings and having bottoms pivotally connected to an eccentric cam whose eccentricity relative to a center shaft is adjustable.

2. A stepless speed change device as set forth in claim 1, wherein resilient means are provided in contact with said planet rollers to produce the frictional transmission between said stationary ring and said internally toothed ratchet rings respectively and said planet rollers.

3. A stepless speed change device as set forth in claim 2, wherein said said planet roller includes a large diameter portion and small diameter portions extending from both sides of said large diameter portion, axes of said large and small diameter portions being aligned with an axis of said planet roller, and said large diameter portions being in contact with an inner circumference of the stationary ring, and said resilient means includes outer rings and resilient wires wound plural times on inner circumferences of the outer rings to which are respectively fixed one end of each resilient wire, outer circumferences of the outer rings being in contact with said small diameter portions of the planet rollers.

4. A stepless speed change device as set forth in claim 2, wherein each said planet roller includes a large diameter portion and small diameter portions extending from both sides of said large diameter portion, axes of said large and small diameter portions being aligned with an axis of said planet roller, and said resilient means includes inner rings and one-way clutch means, said inner rings fitted on opposite shoulders of said internally toothed ratchet rings and frictionally fixed thereto and being in contact with said small diameter portions of said planet rollers, said one-way clutch means being interposed between said stationary ring and said large diameter portions of said planet rollers.

5. A stepless speed change device as set forth in claim 4, wherein said one-way clutch means includes an outer ring and a resilient wire wound plural times about the outer ring and on an inner circumference of said stationary ring to which is fixed one end of the resilient wire.

6. A stepless speed change device as set forth in claim 4, wherein said one-way clutch means includes an outer ring formed on its outer circumference with ratchets, a pawl pivotally connected to said stationary ring, and urging means for urging the pawl against one of the ratchets formed on the outer ring.

7. A stepless speed change device as set forth in claim 4, wherein said one-way clutch means includes an outer ring and an elastic ring press-fitted between the outer ring and the stationary ring.

8. A stepless speed change device as set forth in claim 2, wherein each said planet roller includes a large diameter portion and small diameter portions extending from both sides of said large diameter portion, axes of said large and small diameter portions being aligned wth an axis of said planet roller, and said large diameter portions being in contact with an inner circumference of the stationary ring, and said resilient means includes outer rings and elastic rings made of an elastomer fitted in the outer rings and fitted on said ratchet rings and frictionally fixed thereto, respectively, outer circumferences of the outer rings being in contact with said small diameter portions of the planet rollers.

9. A stepless speed change device as set forth in claim 2, wherein said planet rollers are cylindrical.

10. A stepless speed change device as set forth in claim 2, wherein said resilient means includes outer rings and elastic rings made of an elastomer fitted in the outer rings and fitted on said ratchet rings and frictionally fixed thereto, respectively, outer circumferences of the outer rings being in contact with said planet rollers.

11. A stepless speed change device as set forth in claim 2, wherein said resilient means includes outer rings and resilient wires wound plural times on inner circumferences of the outer rings and about the internally toothed ratchet rings to which are respectively fixed one end of each resilient wire, outer circumferences of the outer rings being in contact with said planet rollers.

12. A stepless speed change device as set forth in claim 2, wherein said resilient means includes an outer ring and an elastic ring made of an elastomer fitted on an outer circumference of the outer ring and an inner circumference of said stationary ring, an inner circumference of said outer ring being in contact with said planet rollers.

13. A stepless speed change device as set forth in claim 2, wherein said resilient means includes an outer ring and a resilient wire wound plural times about said outer ring and on an inner circumference of the stationary ring to which is fixed one end of the resilient wire, an inner circumference of said outer ring being in contact with said planet rollers.

14. A stepless speed change device as set forth in claim 1, wherein a planetary gear assembly is connected to a driven rotary member on an output side of the stepless speed change device.

15. A stepless speed change device as set forth in claim 14, wherein said planetary gear assembly comprises a cylindrical pawl carrier rotatable with a sun gear of the assembly, a pawl pivotally connected in a notch formed in the cylindrical pawl carrier, a ratchet ring fixed to the driven rotary member and having internally toothed ratchets engaging an outer end of the pawl pivotally connected to the pawl carrier when the driven rotary member is being normally rotated, pawl urging means for normally urging the outer end of said pawl pivoted to the pawl carrier against the internally toothed ratchet of the ratchet ring, an irreversible cam fitted through a one-way clutch on the driven rotary member, and a lever pawl acting on the pawl pivotally connected to the pawl carrier to disengage the pawl from the internally toothed ratchet of the ratchet ring when the driven rotary member is being rotated in a reverse direction.

16. A stepless speed change device as set forth in claim 15, wherein said irreversible cam comprises a substantially L-shaped lever pawl which is pivotally connected to the pawl carrier and has one end engaging in a recess of the irreversible cam and the other end acting on said pawl pivotally connected to the pawl carrier to disengage the pawl from the internally toothed ratchet of the ratchet ring when the driven rotary member is being rotated in the reverse direction.

* * * * *